United States Patent [19]

Milne et al.

[11] Patent Number: 4,544,808
[45] Date of Patent: Oct. 1, 1985

[54] TELEPHONE INDICATOR

[75] Inventors: Robin I. Milne, Nepean; Lester Kirkland, Kanata, both of Canada

[73] Assignee: Mitel Corporation, Kanata, Canada

[21] Appl. No.: 542,038

[22] Filed: Oct. 14, 1983

[30] Foreign Application Priority Data

Dec. 14, 1982 [CA] Canada ................................ 417653

[51] Int. Cl.⁴ ............................................. H04M 1/22
[52] U.S. Cl. ........................... 179/99 LS; 179/27 FC; 179/81 C; 179/84 L; 340/365 VL
[58] Field of Search .................. 179/99 LS, 84 L, 94, 179/81 C, 27 FC, 90 AN, 90 L, 18 AB, 18 AD, 175.2 C; 340/784, 716, 712, 723, 791, 793, 365 C, 365 VL

[56] References Cited

U.S. PATENT DOCUMENTS

| | | | |
|---|---|---|---|
| 3,770,898 | 11/1973 | Woodward | 179/18 AB |
| 3,906,168 | 9/1975 | McEowen | 179/84 L |
| 3,920,929 | 11/1975 | Tate | 179/99 |
| 3,937,901 | 2/1976 | Matheny | 179/99 |
| 3,953,683 | 4/1976 | Gabrielson | 179/84 A |
| 4,004,106 | 1/1977 | Yachabach et al. | 179/99 |
| 4,022,989 | 5/1977 | Hoppough | 179/175.2 C |
| 4,212,011 | 7/1980 | Waldron | 340/784 |
| 4,257,045 | 5/1981 | Miles | 340/784 |
| 4,352,959 | 10/1982 | Warnecke et al. | 179/90 K |
| 4,394,544 | 7/1983 | DeLeon | 179/99 H |

FOREIGN PATENT DOCUMENTS 0130806 10/1979 Japan .......................... 179/18 AB Primary Examiner—Gene Z. Rubinson
Assistant Examiner—Elio DiVito
Attorney, Agent, or Firm—Alan H. Levine

[57] ABSTRACT

An indicator for use with a multiline telephone, which displays the status of both a local and called telephone set. The status indicator is comprised of a first indicator enclosed within a second for displaying by a shade or color the status of a called line, and a second indicator at least partly surrounding the first for partly displaying the first for displaying by shade or color with the second indicator the status of the calling line, whereby a party observing the indicator obtains simultaneous indication of the status of the calling and the called lines. Preferably the first indicator is a circle, enclosed within the second indicator which is a square, both being elements of a liquid crystal display. Each square indicator can be located next to a line access pushbutton with which it is associated.

29 Claims, 5 Drawing Figures

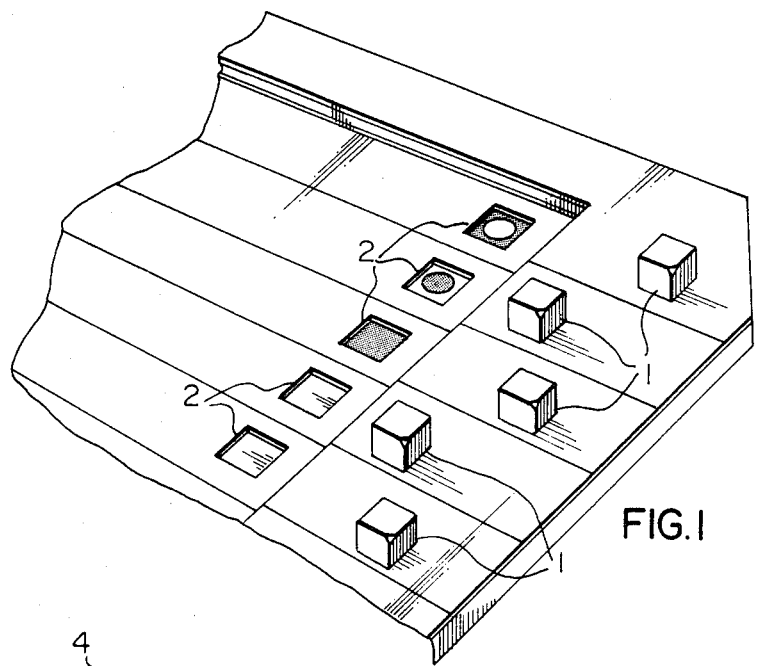
FIG. 1
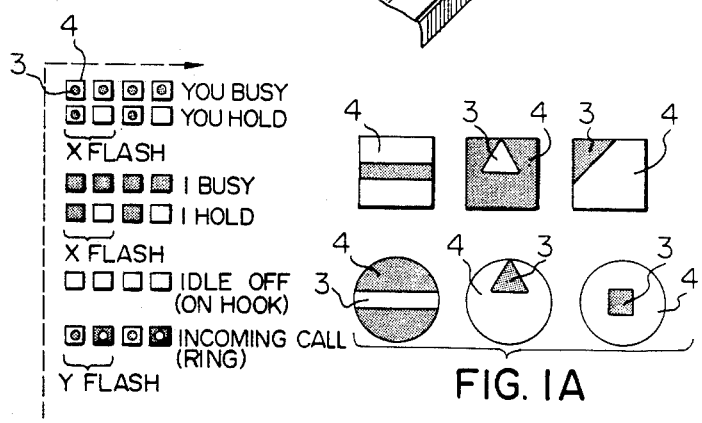
FIG. 1A
FIG. 2
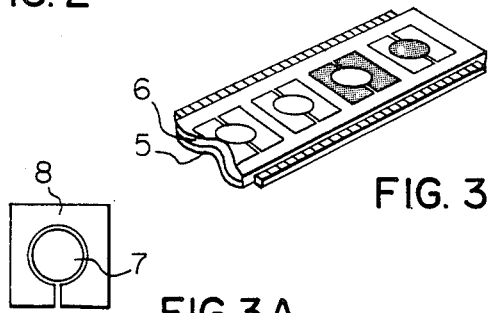
FIG. 3
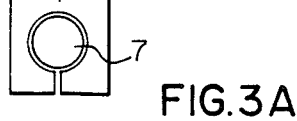
FIG. 3A

TELEPHONE INDICATOR

This invention relates to an indicator particularly useful for a multiline telephone.

Key telephone sets or other telephone sets having access to a plurality of lines typically utilize a row or rows of pushbuttons which, when depressed, give the telephone user access to a telephone line associated with the pushbutton. The pushbutton usually is transparent or translucent, and a light which illuminates the pushbutton provides an indication of the status of the line.

For example, when a telephone is off hook with a particular pushbutton being depressed, the pushbutton lights up. Should a call be incoming on one of the lines, whether the pushbutton is depressed or not, conventionally the pushbutton light flashes at a slow rate. Should a particular line be placed on hold, conventionally the pushbutton light flashes rapidly. Accordingly the state of the local telephone line, and notice of incoming calls is provided to the telephone user.

With the advent of more sophisticated telephone systems, information concerning the status of the called line can be provided to the calling party. The present invention provides a status indicator which indicates clearly and with minimal possibility of misinterpretation the status of both the calling and called lines. The status of both the calling and called lines, whether idle, busy or on hold is provided to the calling party, as well as indication of ringing to the user's telephone. Thus the local telephone user obtains an indication of the exact status of the line to which he is dialing, giving him a more flexible and useful telephone instrument. Further, the form of indication is easily learned and psychologically clear and definite, whereby the possibility of misinterpretation of the status of the calling party and the called party's lines is minimized.

In general, the present invention is a telephone line status indicator structure comprising a first indicator enclosed within a second for displaying by a shade or color the status of a called line, and a second indicator at least partly surrounding the first for partly displaying the first for displaying by shade or color with the second indicator the status of the calling line, whereby a party observing the indicator obtains simultaneous indication of the status of the calling and the called lines.

Preferably the first indicator is a circle, enclosed within the second indicator which is a square, both being elements of a liquid crystal display. Each square indicator can be located next to a line access pushbutton with which it is associated.

It should be understood that while the description below refers to indications for a key telephone system, it can be used in a PABX system, at an operator's console, or shown as a graphic on a cathode ray tube or other display.

A better understanding of the invention will be obtained by reference to the detailed description below, with reference to the following drawings, in which:

FIG. 1 illustrates the indicators as used on a telephone set,

FIG. 1A illustrates various indicator layouts according to the invention,

FIG. 2 illustrates the indicator coding scheme,

FIG. 3 is a perspective view of a series of indicators according to the preferred form of the invention, and FIG. 3A is a layout of the preferred form of an indicator.

FIG. 1 shows a perspective of a portion of a telephone set according to a preferred form of the invention in which the indicators are used. Pushbuttons 1, which connect the telephone to various lines are located in a column or columns at one side of the telephone set, each being associated with an indicator structure 2. Several of the indicator structures are shown in FIG. 1 with different indications, the meaning of which will be described below. In the top indicator, a shaded or dark square surrounds a light or transparent circle; in the second indicator structure the shades are reversed. In the third indicator structure the entire square is dark or shaded and in the fourth the reverse, light or transparent.

According to the preferred form of the invention, a first indicator, such as the circle, is surrounded by a second indicator, such as the square. The first indicator displays a first shade in response to one status of a calling or called party line and a second shade in response to its other status. It is preferred, however, that the first indicator should display a shade in response to the status of the called party line, rather than of the calling party line.

The second, square indicator, which at least partly surrounds the first indicator displays a third shade in response to one status of the other called or calling party lines, and a fourth shade in response to another status of that line. Preferably the second indicator displays the status of the calling party line.

To simplify the indications for the user, it is preferred that the first and third shades should be the same, and the second and fourth shades should be the same, and that the first and second shades should be opposite shades of each other. However, rather than opposite shades, color coding can be used. By opposite shades, it does not mean, in the patent specification, that opposite colors or a color chart or equivalent should necessarily be used although they could be, but merely that dark is opposite shade than light and vice versa.

It is preferred that liquid crystal displays should be used. Consequently the first and second, or third and fourth shades can be solid (or dark) and transparent (or light) respectively.

Further, rather than using a circle surrounded by a square, the first indicator could be of some other shape, i.e. in the form of a bell, a bar extending part way or completely across the square, a centrally located triangle or a triangle extending to a corner or the top of the square, etc. The square could be substituted by a circle, the first indicator can be a bar extending thereacross, etc. Some variations of the structure are shown in FIG. 1A. In this Figure, the indicator structure is comprised of first indicator 3 and second indicator 4. It is intended herein that the first indicator should be enclosed within a second, but this enclosure does not mean full enclosure. The term "enclosed within" is intended to mean within the perceived boundary; i.e., the perceived boundary of the top row of indicators in FIG. 1A is square or rectangular, while the perceived boundary of the second row of indicators in FIG. 1A is circular, oval shape or the like. Consequently while the first indicator 3 in the upper right hand structure shown in FIG. 1A appears to be external to the second indicator 4, it is intended by the definition of the enclosure herein that it should be within the rectangular boundary of the second indicator 4.

While it was noted above the color can be used to indicate telephone line status, it will be understood that a single shade, e.g. black or blue and its opposite shade of white or transparency to a light or contrasting color background would be least expensive in use. FIG. 2 illustrates the preferred form of indicator coding scheme.

According to this embodiment, the shade of both first and second indicators, within the boundary of the second indicator should depict the status of the calling or local telephone line when a call is not underway to another party. Looking at the third, fourth and fifth rows of indicators in FIG. 2, if the local line is busy, the entire area within the boundary of the second indicator is uniformly shaded dark.

If the local line is on hold, the entire area within the boundary of the second indicator flashes alternatively dark and light, as in the fourth row of indicators.

Assuming that the local line is idle (the telephone is on-hook), the entire area within the boundary of the second indicator is light shade, as shown in the fifth row of FIG. 2.

Assuming that another telephone set which has been called on one of the lines appearing on the local telephone set is busy, the first indicator 3 shows constantly dark within the boundary of the light second indicator, as shown in the first row in FIG. 2. Assuming that the other telephone set has placed its line on hold, the first indicator 3 flashes as shown in the second row.

A user thus easily distinguishes between the status of his telephone set and the status of other telephone sets connected to the same line. The status of the line to which his telephone set is connected shows on his indicator as a full block of shade within the boundaries of the second indicator, i.e., as shown in the third, fourth, and fifth rows of FIG. 2. The status of another telephone set to which a call is switched via the same line is easily distinguished by the shade of flashing shade of the smaller first indicator 3.

The present indicator thus provides substantially more information to the telephone user than prior art key telephone line status indicators; a user could not previously tell whether a line is being held from his telephone or from another telephone which has access to the same line, which he now can distinguish.

The indication of ringing to a particular line is shown in the bottom row of FIG. 2. In this case the first and second indicators show different or opposite shades, and simultaneously flash in reverse shades. This has been found to be highly distinctive, and cannot be misinterpreted as a held line, as can prior art key telephone illuminated buttons.

Returning now to FIG. 1, it is clear that the two lines at the bottom of the row are idle, the third line from the bottom is locally busy, the second line from the top is busy at the called line or, if flashing, is on hold at another telephone connected to that line, and the line at the top of the row is in the midst of flashing due to an incoming call ringing the telephone.

Of course other signals could be used, such as indicating busy stations of a called line by flashing the associated indicator at a rate distinguishing from ringing or a held line.

As noted earlier, it is preferred that the indicators should be formed of liquid crystal display elements of well-known construction. For example, one is shown in FIG. 3 comprised of an insulating glass substrate 5 covered by an insulating overlay 6, and having an internal transparent conductor surface of well known form facing the substrate 5. A backplane covered by electrically polymerizable material is located over the glass substrate in a form shown in FIG. 3A. This conductive backplane, using the indicator structure described as being preferred, is formed of a circular conductor 7 surrounded by a rectangular boundary conductor 8 which is gapped from conductor 7 and provides an insulating access gap for a conductor to circular conductor 7. Since the operation and driving circuits for liquid crystal displays are well known, they will not be described in further detail herein.

The present invention has been found to provide a considerable advancement in the structure of multi-line telephones, and has been found to be substantially more "user friendly" than prior art line indicators. Further, since the invention is not restricted to using single shades, with the use of various shades, accessories, circuitry, and with the appropriate liquid crystal display structure, special colors can be illuminated to indicate the meaning of urgency, normalcy, colors matching the color of the telephone set, etc. Indeed, the form of the indicator can be that of the logo of the telephone company or the company using the telephones.

While the above description relates to a preferred and other embodiments, it will be recognized that further embodiments or variations may be designed using the principles described herein. All are considered to be within the sphere and scope of the invention as defined in the claims appended hereto.

We claim:
1. Telephone line status indicating means comprising:
   a first indicator enclosed within a second indicator for displaying a first shade in response to one status of a telephone line associated with one of a calling and called party and a second shade in response to another status thereof,
   the second indicator at least partly surrounding the first indicator for displaying a third shade in response to one status of a telephone line associated with the other of the called and calling party and a fourth shade corresponding to another status of the telephone line associated with said other party,
   whereby the calling party obtains simultaneous indication of the status of his and the called party lines.
2. Telephone line status indicating means as defined in claim 1, including means for indicating a third status of the telephone line associated with at least one of the calling and called party whereby the indicator associated with said at least one party is flashed.
3. Telephone line indicating means as defined in claim 1 or 2 in which the first and third shades are similar to each other, and the second and fourth shades are similar to each other.
4. Telephone line status indicating means as defined in claim 1 or 2 in which busy status is indicated by means of a flashing indicator.
5. Telephone line status indicating means comprising:
   (a) a first indicator enclosed within a second indicator for displaying by one of shade and color the status of a telephone line associated with a called party, and
   (b) the second indicator at least partly surrounding the first indicator for displaying by one of shade and color the status of a telephone line associated with a calling party,
   whereby a party observing the indicating means obtains simultaneous indication of the status of the calling and called lines.

6. Indicating means as defined in claim 5, in which any of the stable and flashing shades of the second and first indicators together are the same and are indicative to the status of a local telephone line associated with a local telephone set, and in which any of the stable and flashing shades of the first indicator alone is indicative of the status of a telephone line associated with another set.

7. For use with a multiline telephone set having a plurality of status indicating means each associated with a telephone line, each said status indicating means as defined in claim 5, in which the status of a telephone line associated with said indicating means relating to said telephone set is indicated by any of the stable and flashing shades of both the first and second indicators together, and the status of a telephone line relating to another telephone set associated with said line is indicated by any of the flashing and stable shades of only the first indicator.

8. Indicating means as defined in claim 5 in which the displaying means indicates the status by varying the shade of at least one of the first and second indicators.

9. Telephone line status indicating means comprising:
(a) a first indicator enclosed within a second indicator for displaying by one of shade and color the status of a telephone line associated with a called party, and
(b) the second indicator at least partly surrounding the first indicator for displaying by one of the shade and color the status of a telephone line associated with a calling party,
(c) the first indicator being a circle and the second indicator being a square,
(d) the displaying means indicating the status by varying in a binary manner the shade of at least one of the first and second indicators,
whereby a party observing the indicating means obtains simultaneous indication of the status of the calling and called lines.

10. Telephone line status indicating means comprising:
(a) a first liquid crystal indicator enclosed within a second liquid crystal indicator for displaying by one of shade and color the status of a telephone line associated with a party,
(b) the second indicator at least partly surrounding the first indicator for displaying by one of shade and color the status of a telephone line associated with a calling party,
(c) the first indicator being a circle and the second indicator being a square,
(d) the displaying means indicating the status by varying in a binary manner the shade of at least one of the first and second indicators,
whereby a party observing the indicating means obtains simultaneous indication of the status of the calling and called lines.

11. Indicating means as defined in claim 8, 9 or 10 in which busy status is indicated by one of a dark and solid indicator and idle status is indicated by one of a light and clear indicator.

12. Indicating means as defined in claim 8, 9 or 10 in which busy status is indicated by one of a dark and solid indicator, and in which an unanswered incoming call is indicated by flashing the indicator in opposite shades.

13. Indicating means as defined in claim 8, 9 or 10 in which busy status is indicated by one of a dark and solid indicator, in which a held line is indicated by flashing at least one indicator within the boundary of the indicator corresponding to a line on hold in alternating shades, and in which an incoming call is indicated by flashing the indicators in opposite shades.

14. A method of indicating the status of a telephone line on a local telephone set comprising:
(a) displaying by the shade of a first indicator on the local telephone set the status of the line as controlled by the local telephone set,
(b) displaying by the shade of a second indicator on the same telephone set the status of the line is controlled by another telephone set on which the same line has appearance, whereby a user of the local telephone set obtains simultaneous indication of the controlled status of the line by both the local telephone and another telephone set.

15. A method as defined in claim 14, including retaining the shades of both the first and second indicators the same first shade if the local telephone set is busy on said line, and retaining the shades of both the first and second indicators the same shade which is different from the first shade if the line is idle.

16. A method as defined in claim 15, including retaining the shade of both the first and second indicators the same, but flashing the indicators together in the event the line is placed on hold by the local telephone set.

17. A method as defined in claim 14, 15 or 16 including flashing only the second indicator in the event the line is placed on hold by the other telephone set.

18. A method as defined in claim 14, 15 or 16 including displaying the second indicator in a different shade from the shade of the first indicator if the line is busy due to the other telephone set and not due to the local telephone set.

19. A method as defined in claim 14, 15 or 16 including flashing the second indicator in a different shade from the first indicator if the other telephone set has placed said line on hold.

20. A method as defined in claim 14, 15 or 16 including flashing the first and second indicators in phase, but with opposite shades, in the event the local telephone set is being rung on said telephone line.

21. A method as defined in claim 15 or 16 in which the first indicator is enclosed within the visual boundary of the second indicator.

22. A method as defined in claim 14, 15 or 16 in which the second indicator is enclosed within the visual boundary of the first indicator.

23. Telephone line status indicating means comprising:
a first indicator enclosed within a second indicator for displaying a first shade in response to one status of a telephone line associated with one of a calling and called party and a second shade in response to another status thereof,
the second indicator at least partly surrounding the first indicator for displaying a third shade in response to one status of a telephone line associated with the other of the called and calling party and a fourth shade corresponding to another status of the telephone line associated with said other party,
busy status being indicated by means of a dark shade and idle status being indicated by means of a light shade,
whereby the calling party obtains simultaneous indication of the status of his and the called party lines.

24. Telephone line status indicating means comprising:

a first indicator enclosed with a second indicator for displaying a first shade in response to one status of a telephone line associated with one of a calling and called party and a second shade in response to another status thereof, the second indicator at least partly surrounding the first indicator for displaying a third shade in response to one status of a telephone line associated with the other of the called and calling party and a fourth shade corresponding to another status of the telephone line associated with said other party, busy status being indicated by means of a dark shade and idle status being indicated by means of a light shade, means for indicating a third status of the telephone line associated with at least one of the calling and called party whereby the indicator associated with at least one party is flashed, whereby the calling party obtains simultaneous indication of the status of his and the called party lines.

25. Telephone line status indicating means comprising:

a first indicator enclosed with a second indicator for displaying a first shade in response to one status of a telephone line associated with one of a calling and called party and a second shade in response to another status thereof, the second indicator at least partly surrounding the first indicator for displaying a third shade in response to one status of a telephone line associated with the other of the called and calling party and a fourth shade corresponding to another status of the telephone line associated with said other party, busy status being indicated by means of a dark shade, idle status being indicated by means of a light shade and a line on hold being indicated by means of a flashing indicator, whereby the calling party obtains simultaneous indication of the status of his and the called party lines.

26. Telephone line status indicating means comprising:

a first indicator enclosed with a second indicator for displaying a first shade in response to one status of a telephone line associated with one of a calling and called party and a second shade in response to another status thereof, the second indicator at least partly surrounding the first indicator for displaying a third shade in response to one status of a telephone line associated with the other of the called and calling party and a fourth shade corresponding to another status of the telephone line associated with said other party, an unanswered incoming call being indicated by flashing of both indicators in different shades relative to each other, whereby the calling party obtains simultaneous indication of the status of his and the called party lines.

27. Telephone line status indicating means comprising:

a first indicator enclosed with a second indicator for displaying a first shade in response to one status of a telephone line associated with one of a calling and called party and a second shade in response to another status thereof, the second indicator at least partly surrounding the first indicator for displaying a third shade in response to one status of a telephone line associated with the other of the called and calling party and a fourth shade corresponding to another status of the telephone line associated with said other party, means for indicating a third status of the telephone line associated with at least one of the calling and called party whereby the indicator associated with at least one party is flashed, an unanswered incoming call being indicated by flashing of both indicators in different shades relative to each other, whereby the calling party obtains simultaneous indication of the status of his and the called party lines.

28. Telephone line status indicating means comprising:

(a) a first indicator enclosed within a second indicator for displaying by one of shade and color the status of a telephone line associated with a called party, and (b) the second indicator at least partly surrounding the first indicator for displaying by one of shade and color the status of a telephone line associated with a calling party, (c) the first indicator being a circle and the second indicator being a square, whereby a party observing the indicating means obtains simultaneous indication of the status of the calling and called lines.

29. A method of indicating the status of a telephone line on a local telephone set comprising:

(a) displaying by the shade of a first indicator on the local telephone set the status of the line as controlled by the local telephone set, (b) displaying by the shade of a second indicator enclosing the first indicator within its visual boundary on the same telephone set the status of the line as controlled by another telephone set on which the same line has appearance, whereby a user of the local telephone set obtains simultaneous indication of the controlled status of the line by both the local telephone and another telephone set.

* * * * *